United States Patent [19]

Borenstein et al.

[11] Patent Number: 5,006,988

[45] Date of Patent: Apr. 9, 1991

[54] OBSTACLE-AVOIDING NAVIGATION SYSTEM

[75] Inventors: Johann Borenstein; Yoram Koren; Simon P. Levine, all of Ann Arbor, Mich.

[73] Assignee: University of Michigan, Ann Arbor, Mich.

[21] Appl. No.: 344,638

[22] Filed: Apr. 28, 1989

[51] Int. Cl.$^5$ .............................................. G06F 15/50
[52] U.S. Cl. ............................. 364/424.02; 180/169; 318/568.16
[58] Field of Search ......................... 364/424.02, 513; 358/103; 180/167–169; 318/568.16

[56] References Cited

U.S. PATENT DOCUMENTS

| | | | |
|---|---|---|---|
| 4,628,453 | 12/1986 | Kamejima et al. | 364/424.02 |
| 4,652,803 | 3/1987 | Kamejima et al. | 318/587 |
| 4,674,048 | 6/1987 | Okumura | 364/424.02 |
| 4,750,123 | 6/1988 | Christian | 364/424.02 |
| 4,799,267 | 1/1989 | Kamejima et al. | 382/1 |

*Primary Examiner*—Thomas G. Black
*Attorney, Agent, or Firm*—Rohm & Monsanto

[57] ABSTRACT

A system for guiding an autonomous or semi-autonomous vehicle through a field of operation having obstacles thereon to be avoided employs a memory for containing data which defines an array of grid cells which correspond to respective subfields in the field of operation of the vehicle. Each grid cell in the memory contains a value which is indicative of the likelihood, or probability, that an obstacle is present in the respectively associated subfield. The values in the grid cells are incremented individually in response to each scan of the subfields, and precomputation and use of a look-up table avoids complex trigonometric functions. A further array of grid cells is fixed with respect to the vehicle form a conceptual active window which overlies the incremented grid cells. Thus, when the cells in the active window overly grid cell having values which are indicative of the presence of obstacles, the value therein is used as a multiplier of the precomputed vectorial values. The resulting plurality of vectorial values are summed vectorially in one embodiment of the invention to produce a virtual composite repulsive vector which is then summed vectorially with a target-directed vector for producing a resultant vector for guiding the vehicle. In an alternative embodiment, a plurality of vectors surrounding the vehicle are computed, each having a value corresponding to obstacle density. In such an embodiment, target location information is used to select between alternative directions of travel having low associated obstacle densities.

32 Claims, 6 Drawing Sheets

AVERAGE SPEED = 0.585 m/sec
APPROX. POSITION OF RODS: +

OBSTACLE-AVOIDING NAVIGATION SYSTEM

BACKGROUND OF THE INVENTION

This invention relates generally to systems for guiding vehicles, and more particularly, to a system for avoiding obstacles which are present in a field of operation of a robotic vehicle which is operated either fully automatically or with operator assistance. In addition, this invention relates to systems for operation of robotic vehicles from remote locations.

There is a need for a system which can reliably implement real-time obstacle avoidance for autonomous or semi-autonomous vehicles, such as mobile robots. Semi-autonomous vehicles might include robots which are guided at least in part by a human operator from a remote location, or from the location of the vehicle itself, as would be the case with a powered wheelchair.

With respect to remotely controlled vehicles, the applications are essentially limitless. For example, such robots may be used to perform household functions, hospital work, industrial material transport, hazardous environment tasks, such as maintenance and other operations in nuclear power plants, sentry tasks, and military tasks, such as patrolling and mine field maintenance. Currently available robotic vehicles which are used, for example, in bomb squad work, are operated with the aid of video cameras which permit the operator to view the field of operation of the vehicle. However, such video equipment generally has a limited field of view which prevents the operator from seeing all obstacles which might be impacted by the vehicle, and are essentially useless in smoke-filled or steam-filled environments.

As indicated, there is a need for a vehicle, such as a powered wheelchair, where the operator provides assistance in navigation. Oftentimes, persons who use powered wheelchairs are capable of indicating generally a desired direction of travel, but may not be possessed of sufficient motor control to guide the wheelchair through a fairly cluttered environment. Additionally, such persons may be deficient in coordination sufficient to negotiate turns or to steer around obstacles notwithstanding that there may be sufficient room. Impairment such as spasticity, tremors, weakness, poor vision, etc. either restrict of render impossible a handicapped individual's ability to operate a powered wheelchair. There clearly is a need for an assistive control system which integrates with an operator's control input to improve tracking and provide automatic obstacle avoidance. In the case of a powered wheelchair, the controls would typically utilize joy stick or switch inputs, although head positioning, voice command, or other control schemes are possible. It is also desirable that, in addition to obstacle avoidance, the assistive control scheme provide automatic wall following so as to avoid the need for a handicapped individual to maintain a steady course in a long or narrow corridor. Of course, it is highly desirable to avoid the oscillatory performance which has plagued prior art robotic control systems.

Ideally, an assistive steering control system should follow the general direction prescribed by the operator of the device, such as a wheelchair. However, if the vehicle should encounter an obstacle, the system should autonomously avoid collision with that obstacle while trying to maintain the prescribed course as closely as possible. Once the path has been cleared, the vehicle can resume its motion in the prescribed direction. It is additionally desirable that the integral self-protection mechanism permits steering of the wheelchair or other vehicle at high speeds and in cluttered environments without fear of collisions. Thus, there is a need for a system which performs course corrections during vehicle operation, without requiring the vehicle to be stopped, or to be slowed substantially, while it computes its obstacle-avoiding path.

In addition to obstacle avoidance and wall following, it is highly desirable that an autonomous or assisted navigation system have the capacity to ascertain whether the vehicle can be accommodated through narrow passageways, doorways, and tight spaces, and to negotiate a path through same in response to the general indication of a forward control command. Moreover, it is highly preferred that the system have the capacity to recognize obstacles which are not stationary, or which appear suddenly, such as a person or other vehicle exiting a doorway onto a corridor where the subject vehicle is operating.

As indicated, there has been a continuing effort in the prior art to create a vehicle guidance and obstacle avoidance system which permits maximization of the rate at which the vehicle travels and which does not require the vehicle to stop or slow down significantly upon encountering an obstacle. One prior art approach to this problem involves the building of a map in a computer memory which employs cells which correspond to a predetermined active region in the field of operation of the vehicle. The field of operation is divided into corresponding cells, and in response to ultrasonic scanning, an assumed probability function is computed, which is selected to cover a plurality of the subfields by loading into same respective values which are believed to correspond to the probability that an obstacle is present therein. This prior art approach has a variety of significant drawbacks. First, all of the cells within a predetermined range are incremented simultaneously in response to the computation of the assumed probabilistic function. This carries such a significant computational overhead that the vehicle must be stopped upon encountering an obstacle to complete the computation. However, the deficiencies in this known system are not eliminated entirely by use of a faster computer. More specifically, the underlying assumption of the suitability of a particular probabilistic function may be incorrect for a given operating environment or distribution of obstacles, and may result in the computation of an incorrect function. Succinctly stated, the general characteristics of the distribution of obstacles must be ascertained so as to permit selection of the most likely appropriate probabilistic function to be computed, and which will subsequently result in the incrementation of the cells. The ultimate end to be achieved by this known system is the generation of a map of the probability, or likelihood, of the presence of an obstacle in any given cell. After the map is constructed the vehicle is steered around the obstacles. This approach is so computation intensive that it cannot be implemented without stopping the vehicle. Additionally, the known system is unable to achieve a level of resolution sufficient to permit maneuvering of a vehicle through an obstacle-cluttered environment.

It is, therefore, an object of this invention to provide a simple and economical system for guiding an autonomous vehicle through a field of operation having obstacles thereon.

It is another object of this invention to provide a vehicle guidance system which can effect obstacle avoidance without stopping or slowing the vehicle significantly.

It is also an object of this invention to provide a vehicle guidance system which is responsive to operator input while simultaneously affording protection from collision with obstacles.

It is a further object of this invention to provide a system which can prevent collisions with rapidly appearing obstacles by a vehicle.

It is additionally an object of this invention to provide a system for steering a vehicle from a remote location while the vehicle is in an environment which prevents visual feedback to the operator.

It is yet a further object of this invention to provide a vehicle guidance system which can select automatically between alternative, obstacle-free paths.

It is also another object of this invention to provide a powered wheelchair which can be operated easily by handicapped individuals.

It is yet an additional object of this invention to provide a navigation system having a sufficiently high level of resolution to determine whether a vehicle, such as a motorized wheelchair, can pass through a region of limited width, such as a narrow doorway.

It is still another object of this invention to provide a system for guiding a robotic vehicle in a field of operation having obstacles thereon wherein data from a plurality of sensor types can easily be incorporated into the system.

It is a yet further object of this invention to provide a system for guiding a robotic vehicle in a field of operation having obstacles thereon wherein data from a prior trip by the robotic vehicle obtained from sensors which may be arranged on or off of the robotic vehicle, can be incorporated into a memory and used to help guide the robotic vehicle during subsequent trips.

SUMMARY OF THE INVENTION

The forgoing and other objects are achieved by this invention which provides, in a first method aspect thereof, a method of operating a vehicle to avoid an obstacle in a field of operation. In accordance with this method aspect of the invention, first data is installed in a first memory for defining a first array of grid cells, each for holding data corresponding to a respective value. The first grid cells correspond to respective predetermined subfields in the field of operation of the vehicle. The method continues with the steps of scanning one of the subfields in the field of operation for determining the presence of an obstacle therein, and incrementing the value in a first grid cell in the first array corresponding to the scanned one of the subfields in response to a signal which is responsive to the step of scanning and which indicates a likelihood that an obstacle is present in the scanned one of the subfields.

In one embodiment of the invention, there are provided the further steps of defining a region of operation in the vicinity of the vehicle, and computing a plurality of vectorial values. Each of the vectorial values is responsive to the location of each first grid cell in the first array within a predefined region of operation. Additionally, the vectorial value is responsive to the location of the first grid cell with respect to the location of the vehicle, and the value in the first grid cell. The step of defining also includes the step of installing in a second memory second data which defines a second array of second grid cells. Each such second grid cell holds data corresponding to a respective value, and has a fixed positional relationship with respect to the vehicle. Further in accordance with this embodiment of the invention, a plurality of vectorial value components are precomputed, each such component being responsive to the location of an associated one of the second grid cells with respect to the vehicle. Additionally, the vectorial value components are stored in a second memory.

Conceptually, this method aspect of the invention includes the further step of overlaying the second array over the first array whereby at least partial registration is achieved between the first and second grid cells. The vectorial values in the second grid cells are multiplied by corresponding values in the first grid cell, the association being responsive to the aforementioned registration. In this manner, a respective virtual repulsive vector value is computed. The respective virtual repulsive vector values are summed vectorially so as to form a composite repulsive virtual vector value.

In addition to the forgoing, a target-directed vector is stored in a third memory. The data corresponding to this targetdirected vector is summed vectorially with the composite repulsive virtual vector value so as to produce a vehicle-steering vector value. The steering mechanism of the vehicle is then actuated so as to conform to the vehicle-steering vector value.

In certain embodiments of the invention, the vehicle-steering vector value changes rapidly, and may result in abrupt changes in the direction of the vehicle. This deficiency may be corrected by subjecting the vehicle-steering vector value to lowpass filtering. In this manner, the rate of variation of the vehicle-steering vector value is reduced.

As is evident from the forgoing, the complexity of the computations required to be performed are reduced by precomputing at least the directional component of the vectorial values, and storing same in a look-up table. Thus, once the registration between the first and second grid cells is effected, complete vectorial values are obtained merely by multiplication. Moreover, additionally inherent in such precomputing is the establishment of a relationship with respect to distance between the subject grid cell and the vehicle. Preferably, the vectorial values are inversely related to distance $d^x$ where d is the distance between a second grid cell and the vehicle, and x is a positive real number. In a practical embodiment of the invention, $x=2$.

In accordance with a further embodiment of this first method aspect of the invention, the first array of the first grid cells defined by the first data is a rectangular array, and there is provided the further step of constructing a polar histogram corresponding to the vicinity of the location of the vehicle. In this embodiment the polar histogram can have a predetermined number of angular segments n, each having a predetermined width r. In embodiments where it is desired to obtain information in all directions around the vehicle, $nr=360$.

In this embodiment of the invention, each of the segments of the polar histogram has associated therewith a polar obstacle density value which corresponds to a predetermined direction with respect to the location of the vehicle. This embodiment includes the further steps of selecting a direction for the vehicle which corresponds to one of the n angular segments in response to the polar obstacle density value, and directing the vehicle in the selected direction.

The construction of the polar histogram includes the step of defining an active region in the vicinity of the vehicle. Subsequently, a plurality of obstacle vector values are computed, each such value having a directional component which is generally responsive to the location of each first grid cell in the first array within the defined active region, with respect to the location of the vehicle. There is further provided the step of computing a magnitude component of the obstacle vector values, the magnitude component being responsive, as previously indicated, to respective distances between the vehicle and the first grid cells, and the values in those grid cells. Since a target location is known, the selection of the direction of travel of the vehicle includes the step of searching the obstacle vector values for a direction having associated therewith a low obstacle density, and selecting between two directions having equally low obstacle densities in response to ascertainment of which such direction is more readily directed toward the target location. Thus, the most suitable direction is selected. In addition, the value of the obstacle density in the selected direction can be used to control the speed of the vehicle.

In accordance with an apparatus aspect of the invention, a vehicle for traveling in a region of operation having obstacles to be avoided is provided with a first memory for containing first data which defines a first array of first grid cells. Each such grid cell holds data which corresponds to a respective value and corresponds to a respective predetermined subfield in the region of operation. The vehicle is further provided with a scanner for scanning one of the subfields for determining the presence of an obstacle therein. A processor increments a value in the first memory associated with a scanned one of the subfields. The incrementation is responsive to a signal issued by the scanner which is indicative of a likelihood that an obstacle is present in the scanned one of the subfields. An input device, which is coupled to the processor, is provided on the vehicle for producing data which is responsive to a desired direction of travel. In practice, the operator manipulates the input device in a manner indicative of the desired direction of travel.

In a specific illustrative embodiment of the invention, the vehicle is adapted to operate in combination with the operator, as would be the case with a powered wheelchair. However, in other embodiments of the invention, the operator is remote from the vehicle, as is the input device.

In a further embodiment of this apparatus aspect of the invention, the data which is produced by the input device corresponds to a vector which has a direction component indicative of the desired direction of travel. However, in other embodiments of the invention, the input device can produce data which corresponds to a location in the region of operation of the vehicle to which the vehicle is desired to travel. Thus, such data may correspond to a target location.

In accordance with another method aspect of the invention, a method of operating a vehicle to avoid an obstacle in a field of operation includes the steps of installing in a first memory first data for defining an array of first grid cells, each for holding data corresponding to a respective value, the first grid cells in the first array corresponding to respective predetermined subfields in the field of operation; installing in a second memory data corresponding to a desired direction of travel of the vehicle; scanning the subfields sequentially for determining the presence of an obstacle therein; incrementing the values in the first grid cells in response to the step of scanning, the values thus incremented being indicative of the likelihood, or probability, of an obstacle being present in the subfield; defining an active region of operation in the vicinity of the vehicle; computing a plurality of vectorial values, each vectorial value having a direction component responsive to the location of each first grid cell in the array within the defined region of operation, with respect to the location of the vehicle in the active region of operation, and a magnitude component responsive to the likelihood of and obstacle being encountered in the direction within the region of operation; and steering the vehicle in a direction responsive to the data in the second memory and the vectorial values.

In a specific embodiment of this method aspect of the invention, the step of installing data corresponding to a desired direction of travel of the vehicle in a second memory includes the step of manipulating a direction-indicating device. Additionally, the step of steering the vehicle includes the further steps of summing vectorially the vectorial values obtained in performing the step of computing, for forming a composite repulsive virtual vector value, and combining vectorially the composite repulsive virtual vector value with the data in the second memory for producing a resultant directional vector. The vehicle then is steered in a direction which is responsive to the resultant directional vector.

In accordance with a still further method aspect of the invention, the method of operating the vehicle to avoid obstacles in a field of operation includes the steps of installing in a first memory first data defining a first array of first grid cells, each for holding data corresponding to a respective value. The first grid cells in the first array correspond to respective predetermined subfields in the field of operation of the vehicle. This method aspect of the invention includes the further step of producing a representation of the first data on a monitor screen. In such an embodiment, however, the specific subfields need not be identified. Subsequently, the subfields are scanned to determine the presence of an obstacle therein, and the value in the first grid cell which corresponds to the scanned one of the subfields is incremented in response to a signal which is responsive to the step of scanning. The signal is indicative of a likelihood that an obstacle is present in the scanned one of the subfields. The incrementation is represented on the monitor.

The resulting representation on the monitor corresponds to an obstacle map of the field of operation. Additionally, the monitor screen may indicate the location of the vehicle in the field of operation. This vehicle location data, in certain embodiments, is responsive to data which is obtained in response to motion of the vehicle in the field of operation. For example, a counter which is responsive to the rotations of the wheels of the vehicle may be employed to generate position data.

In a still further method aspect of the invention, a method of guiding a vehicle on a field of operation having obstacles to be avoided thereon includes the steps of dividing the field of operation into a plurality of subfields; assigning a predetermined certainty value associated with each of the subfields; scanning selected ones of the subfields for establishing the possible presence of an obstacle thereon; incrementing the certainty value associated with each of the subfields for which it is established in the step of scanning that an obstacle possibly is present thereon; and computing a vector value responsive to the location of at least one of the subfields with respect to the location of the vehicle, and the certainty value associated therewith.

In a specific embodiment of this further aspect of the invention, there are provided the further steps of further computing a plurality of vector values having direction components corresponding to a range of potential directions of travel of the vehicle, and selecting a direction of travel for the vehicle in response to a magnitude component of at least one of the vector values.

BRIEF DESCRIPTION OF THE DRAWING

Comprehension of the invention is facilitated by reading the following detailed description, in conjunction with the annexed drawing, in which.

DETAILED DESCRIPTION

Figure 1:
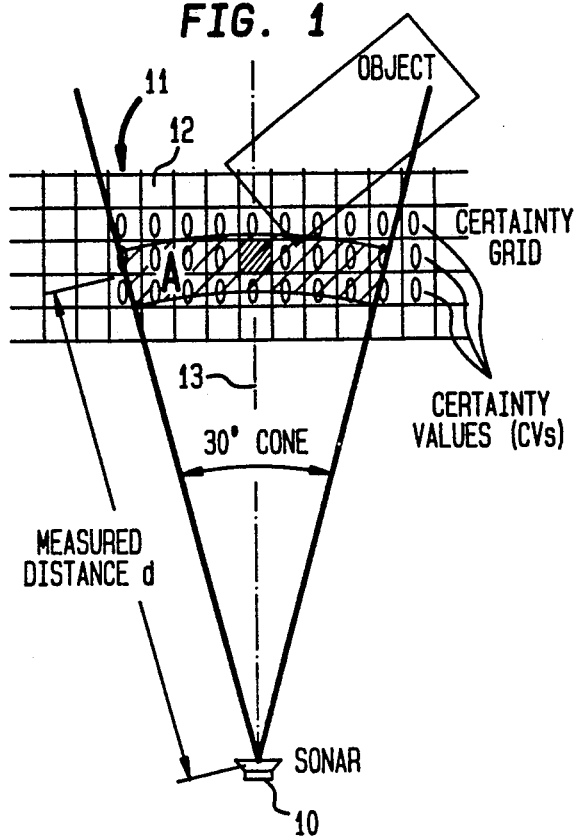
FIG. 1 is a schematic representation of a two-dimensional projection of a conical sensing zone of an ultrasonic transducer onto a two-dimensional grid.

FIG. 1 is a schematic representation of a sonar transducer 10 and its field of view which is illustrated in the figure as a 30° cone. As shown in the figure, the field of operation of the vehicle (not specifically identified in this figure) on which sonar transducer 10 is installed is divided into a grid array 11 which is formed of a plurality of subfields 12. Each such subfield has associated therewith a certainty value which is shown to be 0 within a region A. Each certainty value, after performing the scanning operations described hereinbelow, indicates a corresponding measure of confidence that an obstacle exists within the cell area. In a practical embodiment of the invention, sonar transducer 10 is of a commercially available type which is manufactured by Polaroid Corporation, and returns a radial measure of distance to the nearest object within the conical field. It is a problem with such transducers, however, that they do not specify the angular location of the object. Thus, a sonar reflection received by sonar transducer 10 within a predetermined period of time will indicate that an object is present anywhere within area A which is at a predetermined distance d from the sonar transducer. It is a well known characteristic of these sensing devices that if an object is detected by an ultrasonic sensor, such as sonar transducer 10, it is more likely that the object is closer to the acoustic axis, such as axis 13, of the sensor than to the periphery in the conical field of view.

In accordance with the invention, an indication of presence of an object within area A will result in the incrementation of the certainty value which is associated with the grid cell which is on axis 13 and within active area A. In this figure, this grid cell is shown to be shaded. Thus, high computational overhead is avoided by incrementing the certainty value associated with only one grid cell for each scan of the sonar transducer.

Figure 2:
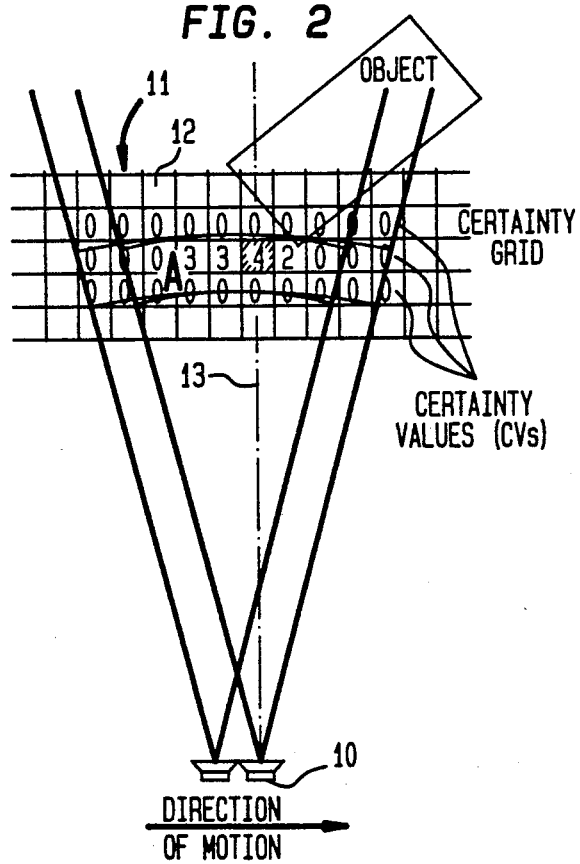
FIG. 2 is a two-dimensional projection of the conical sensing zone, as shown in FIG. 1, after being displaced by vehicle travel.

FIG. 2 is a schematic representation similar to that of FIG. 1, except that sonar transducer 10 has been moved in a direction shown in the drawing. The motion of sonar transducer 10 is shown, in this specific situation, to be parallel to an axis of grid array 11, and accordingly, some of the certainty values have been incremented so as to have a value greater than 0. The illustration of FIG. 2 shows the certainty value in the grid cell, or subfield, adjacent to the one shown in FIG. 1, being incremented. As previously indicated, the location of an object which causes an acoustic reflection of the transducer's energy has a higher probability of being on the acoustic axis, than off axis.

Figure 3:
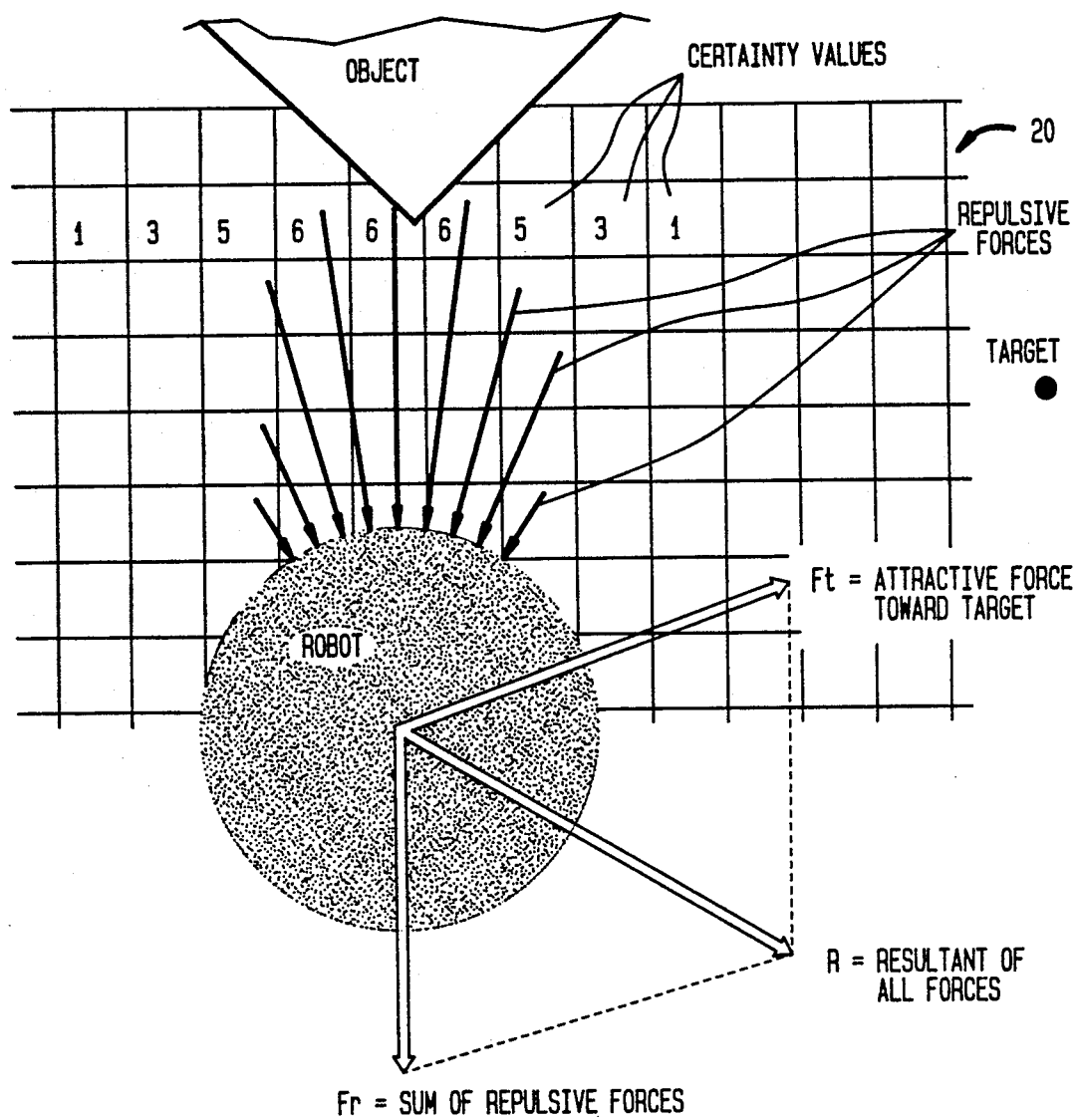
FIG. 3 is a schematic representation which is useful for describing a virtual force field (VFF) method of computing a steering vector.

FIG. 3 is a schematic illustration of a virtual force field showing obstacles exerting conceptual forces onto a mobile robot. As shown in the drawing, the robotic vehicle is subjected to repulsive forces which have magnitudes which are proportional to the certainty values, and inversely proportional to, in this specific illustrative embodiment, the square of the distance between the robot and the respective grid cells. The repulsive forces are summed vectorially to produce a composite repulsive force Fr. This composite repulsive force is resolved vectorially with a virtual force vector Ft which is directed toward a target location to which the vehicle is desired to travel. These virtual, or conceptual, forces are resolved so as to produce a virtual force R which is the resultant of all forces.

The magnitude of target-directed force Ft generally is selected to remain constant within a given application for the robot vehicle, but can be varied from application to application for the purpose of producing desirable behavioral characteristics for the robot. In one practical embodiment of the invention, the magnitude of force Ft is selected to be one hundred times the magnitude of the repulsive force which is seen by the robot at fifty centimeters from an object. This magnitude was selected experimentally, as was the distance, for the particular characteristics of a Cybermation K2A Mobile Robot Platform which has a maximum operating speed on the order of 0.78 meters per second. Persons of skill in the art would understand a need to increase or decrease the distance between the vehicle and the active region, as well as the magnitude of the target-directed vector, in response to the parameters which govern the operating characteristics of the robotic vehicle.

The system described in FIG. 3 is a real-time obstacle avoidance method for fast-running vehicles. This system allows for smooth motion of the controlled vehicle among densely cluttered and unexpected obstacles. Moreover, a vehicle controlled under this system does not stop in front of obstacles.

This system utilizes a two-dimensional cartesian histogram grid for representation of obstacles. More specifically, this system creates a probability distribution without significant computational overhead by incrementing only one cell in the histogram grid for each range-reading. As indicated, this cell is the one which corresponds to the measured distance D and which lies on the acoustic axis, as described hereinabove. A probabilistic distribution is obtained by continuously and rapidly sampling each sensor while the vehicle is moving. In this manner, the same cell or neighboring cells are repeatedly incremented resulting in a histogrammic probability distribution in which high certainty values are obtained in cells which are close to the actual location of the obstacle. Erroneous range readings, such as those which result from noise, will not result in repeated incrementation of a cell, and therefore will not significantly affect to navigation of the robotic vehicle.

In FIG. 3, grid array 20 is conceptually different from grid array 11 discussed hereinabove with respect to FIGS. 1 and 2. More specifically, grid array 20 remains in fixed relation to the robot, and the cells therein therefore do not correspond to specific, or respective, ones of the subfields in the field of operation of the robotic vehicle. In essence, grid array 20 is a window which overlies a square region in grid array 11. Those cells, corresponding to subfields 12 in FIG. 2, which are momentarily covered by the active window represented by grid array 20 in FIG. 3, are called "active cells." Only virtual forces from active cells are added up in order to calculate repulsive force Fr.

In a specific illustrative embodiment of the invention, grid array 20 is formed of 33 by 33 window cells, for a total of 1089 window cells. In a highly advantageous embodiment of the invention, repulsive force vectors are precomputed for each of the 1089 grid cells. Such repulsive forces each have a directional component which is responsive to the location of the particular grid cell with respect to the robot, and a magnitude component which is responsive to the distance between the robot and the particular cell. These repulsive vector values are stored in a memory (not shown), illustratively a look-up table. Thus, as the robot moves along the field of grid array 11, the cells in grid array 20 overlie the cells corresponding to subfields 12, and the certainty values therein are used as multipliers in the computation of the total repulsive force Fr. This approach eliminates significant computational overhead by obviating the need to calculate trigonometric functions for each of the repulsive forces as the vehicle moves. Moreover, the extremely rapid computations are entered into the memory immediately, thereby affording to the vehicle the ability to respond quickly to suddenly appearing obstacles. This is imperative when traveling at high speeds.

In certain situations, such as when the robot is traveling at high speed, a large difference in the certainty values stored in neighboring grid cells may result in rapid variation in the resultant virtual force R. In a practical embodiment of the invention, a low-pass filter (not shown) was used to smooth the control signal to the steering motor (not shown) of the robotic vehicle. However, the filter introduced a delay which might adversely affect steering response to unexpected obstacles when the robotic vehicle travels at high speed.

Figure 4A:
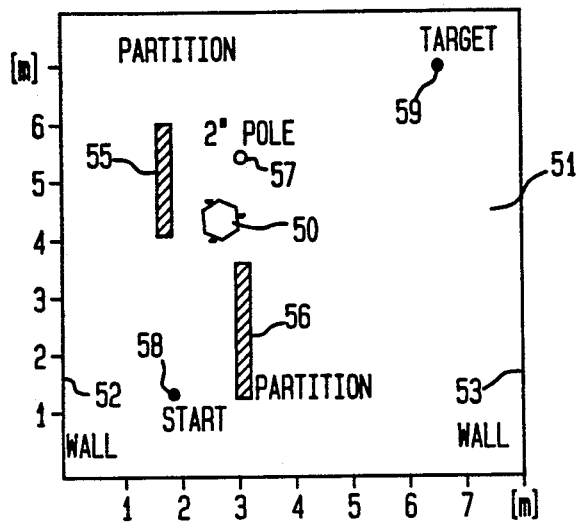
FIGS. 4A, 4B, and 4C represent a field of operation for a robotic vehicle, a computer representation of the field of operation including representation of the certainty values therein, and a graphical representation of the obstacle density vectors, respectively, in a vector field histogram (VFH) method of guiding the robotic vehicle.
Figure 4B:
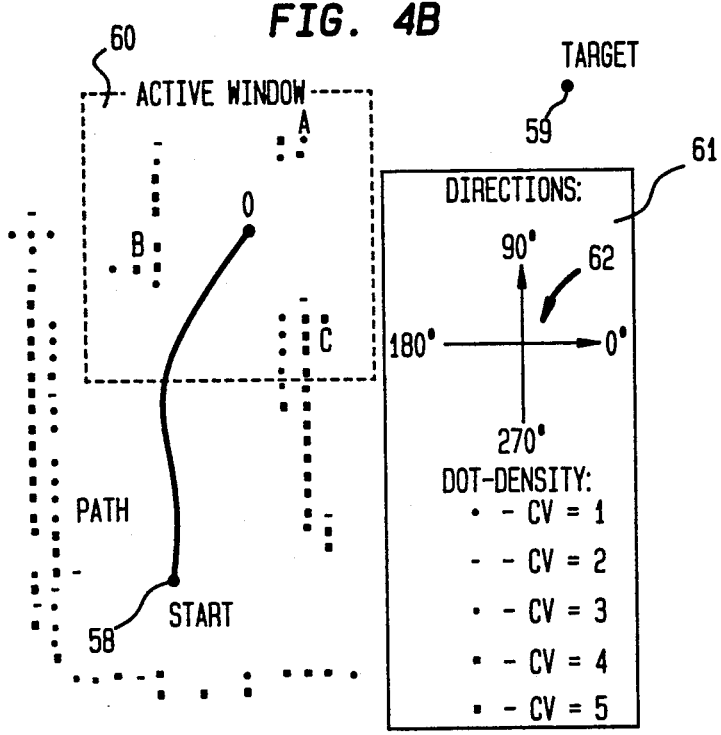
Figure 4C:
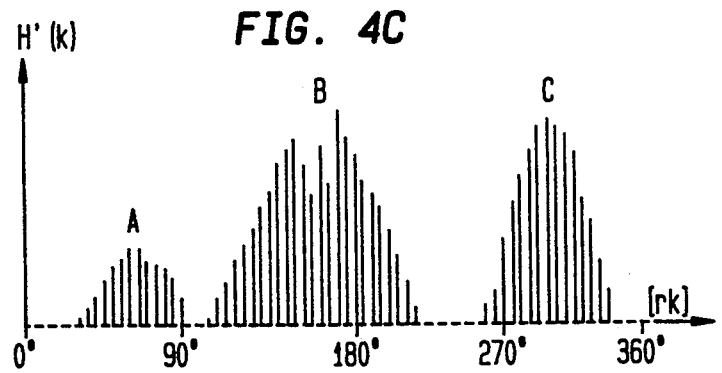

FIGS. 4A, 4B and 4C illustrate a vector field histogram (VFH) technique which employs a two-stage data reduction system, instead of the single step technique used in the system of FIG. 3. Since the system of FIGS. 4A, 4B, and 4C is a two-stage data reduction system, it maintains a statistical data structure in both, the operating field model and the intermediate level. This characteristic affords improved steering response over the virtual force field method described above, which is a singlestage data reduction system.

As shown in FIG. 4A, a robotic vehicle 50 is arranged in a field of operation 51. In this specific situation, field of operation 51 is bounded by walls 52 and 53. Also shown in FIG. 4A are three obstacles, in the form of partitions 55 and 56, and a two-inch pole 57. Robotic vehicle 50 is shown in a location which is intermediate of a start position 58, on its way to a target position 59.

FIG. 4B is a representation of the path of travel of robotic vehicle 50 from the start position 58 to its present location, which is designated as "0" in the figure. Location 0 in FIG. 4B corresponds to the location of the robotic vehicle in FIG. 4A. In addition, location 0 is centrally located within an active window 60 which, as previously indicated, travels with the robotic vehicle. In a computerized embodiment of the invention, where FIG. 4B may be a representation on a monitor screen, an instruction window 61 provides information which is useful in interpreting the various markings which are shown immediately to the left thereof. First, instruction window 61 shows a directional indicator 62 which indicates the direction in which the robotic vehicle is facing. Immediately below the directional indicator is a table which correlates dot density to a certainty value. As can be seen from this table, the heavier dots correspond to greater certainty values.

Prior to continuing the description of the figures, it is useful to understand the manner in which the histogram grid is reduced to a single dimensional polar histogram which is constructed around the robotic vehicle's momentary location. The polar histogram comprises n angular segments, each of width r, such that $nr = 360°$. Each segment holds a value h(k) which represents the polar obstacle density in that particular direction. From among all histogram segments having low obstacle density, the most suitable one is selected, and the vehicle's steering system is aligned with that direction.

The first step in the process of generating the polar histogram is to update the histogram grid in the manner described hereinabove with respect to the virtual force field method. Subsequently, there is provided the process of data reduction, which includes reducing the histogram grid C(i,j) to the polar histogram H(k). H(k) has an arbitrarily chosen angular resolution (i.e., $r = 5°$, and its argument k is a discrete angle quantized to multiples of r, such that $k = 0, r, 2r, \ldots 360 - r$.

H(k) is calculated as follows: Along with the robotic vehicle moves a notional window (active window 60), and the cells which are momentarily covered by the active window are termed, for present purposes, "active cells." The contents of each active cell in the histogram grid is treated as an obstacle vector, the direction of which is determined by the direction from the cell to the robotic vehicle. The magnitude of the obstacle vector is proportional to the certainty value of the particular cell, and linearly proportional to the distance between the cell and the robotic vehicle. For current purposes, the active window covers an area of $w_s$ by $w_s$ cells in the histogram grid. Mathematically:

$$H(k) = \sum_{i,j} M(i,j) \qquad \text{Eq. 1}$$

where, $$k = r(INT(\alpha/r)) \qquad \text{Eq. 2}$$

with, $$\alpha = tg^{-1} \frac{y_i - y_0}{x_i - x_0} \qquad \text{Eq. 3}$$

and $$M(i,j) = a - bd(i,j) \, C^2(i,j) \qquad \text{Eq. 4}$$

where, $\alpha$ = Direction from cell (i,j) to vehicle
M(i,j) = Magnitude of the obstacle vector at cell (i,j)
d(i,j) = Distance between cell (i,j) and the vehicle
C(i,j) = Certainty value of cell (i,j)
a,b = Constants
$x_0, y_0$ = Robotic vehicle's present coordinates
$x_i, y_j$ = Coordinates of cell (i,j)

It is to be noted that :

a. C(i,j) in Eq. 4 is squared in this specific embodiment. This serves to express high confidence in the likelihood that recurring range readings represent actual obstacles. This is in contrast to single occurrences of range readings, which may be caused by noise; and b. C(i,j) in Eq. 4 is proportional to −d. Thus, occupied cells produce large vector magnitudes when they are in the immediate vicinity of the robotic vehicle, and smaller ones when they are further away.

Finally, a smoothing function is applied to H(k), which is defined by:

$$H'(k) = \frac{H(k-n) + 2H(k-n+1) + \ldots + 2H(k+n-1) + H(k+n)}{2n+1}$$

In a practical embodiment of the invention, satisfactory smoothing results are achieved when n=5.

FIG. 4C is a graphical representation of a polar histogram which results from obstacles A (2 inch pole 57), B (partition 55), and C (partition 56). This figure illustrates the obstacle densities seen from the position of the robotic vehicle. Once the polar histogram is constructed, a direction is selected which is free of obstacles. For purposes of the present analysis, the selected direction free of obstacles shall be denominated "$\theta$free'" and the corresponding discreet argument to H'(k), "$k$free". Since there usually are several obstacle-free directions available, the algorithm will choose $\theta$free which is close to the direction of the target, $\theta$targ($k$targ). Two basic cases may be distinguished.

Figure 5A:
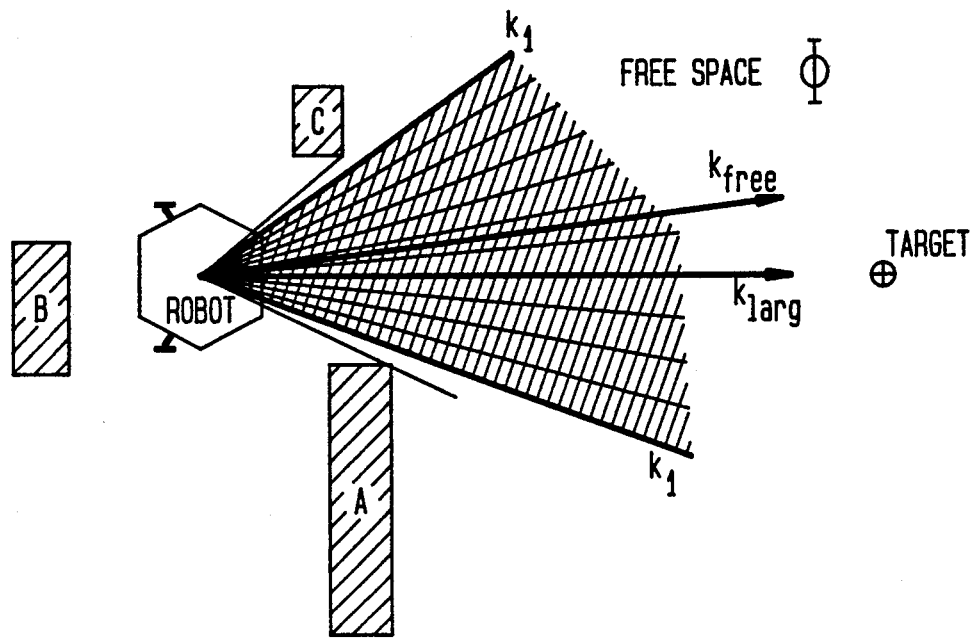
FIGS. 5A and 5B are schematic representations which illustrate the situations when the direct path between the vehicle and the target is free, and when it is obstructed, respectively.

In the first case, H'(k) in the direction of the target ($k_{targ}$) is free, as shown in FIG. 5A. The algorithm detects this condition by comparing H'($k_{targ}$) with a preset threshold value, $H_{max}$. H'($k_{targ}$)<$H_{max}$ means that the polar obstacle density in the direction of travel is small enough to allow safe travel.

In this first case, the algorithm searches alternatingly to the left and to the right of $k_{targ}$ until an occupied segment is found. In a preferred embodiment, the search is limited to a maximum number of $\frac{1}{2}c_{max}$ segments on either side. If an occupied segment is found, the algorithm labels the last free segment $k_0$, and also notes whether it is to the left or the right of $k_{targ}$. Subsequently, the algorithm continues in L-mode or R-mode, as described hereinbelow. If no occupied segment is found, within the range of $\frac{1}{2}c_{max}$ segments on either side, then the path to the target is considered free, and $\theta$free is set equal to $\theta_{targ}$.

Figure 5B:
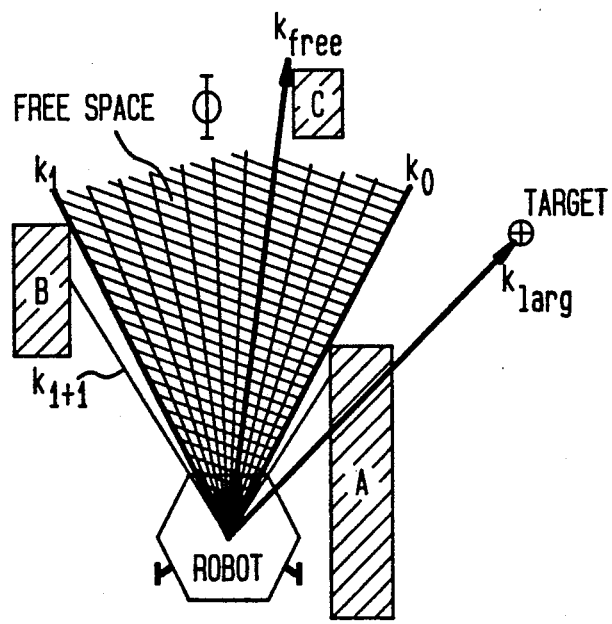

In the second case, the segment in the direction of travel to the target is occupied, as shown in FIG. 5B. The algorithm checks whether L-mode or R-mode were active in the previous sampling interval, or if the path was clear (as in the first case). In response to this test, the algorithm proceeds to step a. or step b., below.

a. If the path was clear in the preceding sampling interval, then a new obstacle has been encountered. The algorithm searches alternatingly to the left and to the right of $k_{targ}$ for a free segment, using the condition:

$$H'(k_{targ} \pm n \, r) < H_{max} \qquad Eq. 6$$

with n=1, 2, ... , 36 (36r=180° at an angular resolution of r=5°)

The first free segment found is labeled $k_0$, and the algorithm will note whether it is located to the left or the right of $k_{targ}$, by setting L-flag or R-flag. Subsequently, the algorithm will proceed in L-mode or R-mode, as described hereinbelow.

b. If this is not the first time that an obstruction has been encountered, then either mode flag will already be set. In this case, the algorithm will not alternatingly search for a free segment, but only to that side of $k_{targ}$ that is indicated by L-flag or R-flag. The search is limited to 180°, or until a free segment $k_0$ is found. Subsequently, the program will proceed in L-mode or R-mode.

The situation in FIG. 5B corresponds to L-mode, and will be used to explain this mode. L-mode counts adjoining free segments to the left of $k_0$. The occurrence of the first non-free segment, denoted as $k_{1+1}$ and defined by H($k_{1+1}$)>$H^{max}$, or a maximal count of $c_{max}$=18 free segments (18 being an arbitrary number), terminate this count. The values $k_1$ and $k_0$ represent the borders of free space, which is denoted as $\Phi$, given by:

$$k_{free} = (k_1 - k_0)/2 \qquad Eq. 7$$

Figure 6A:
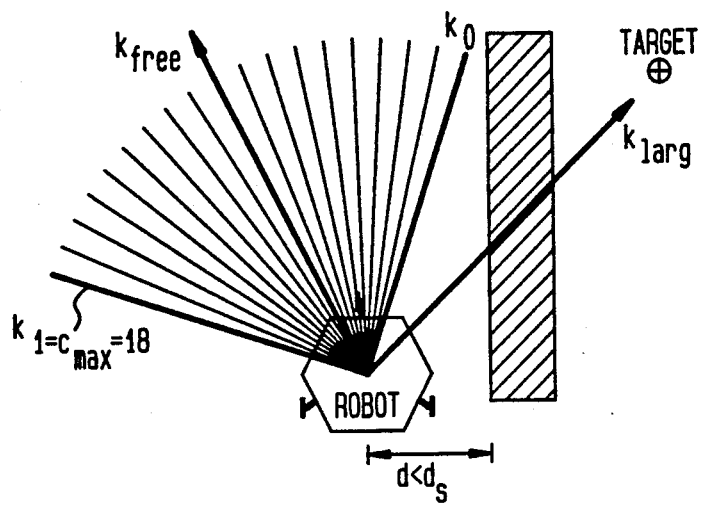
FIG. 6A, 6B, and 6C illustrate a free space derived from the polar histogram of the vector field method so as to ensure a stable path when the vehicle travels alongside an obstacle, for the situations where the vehicle is too close to the obstacle, too far from the obstacle, and at a proper distance from the obstacle, respectively.
Figure 6B:
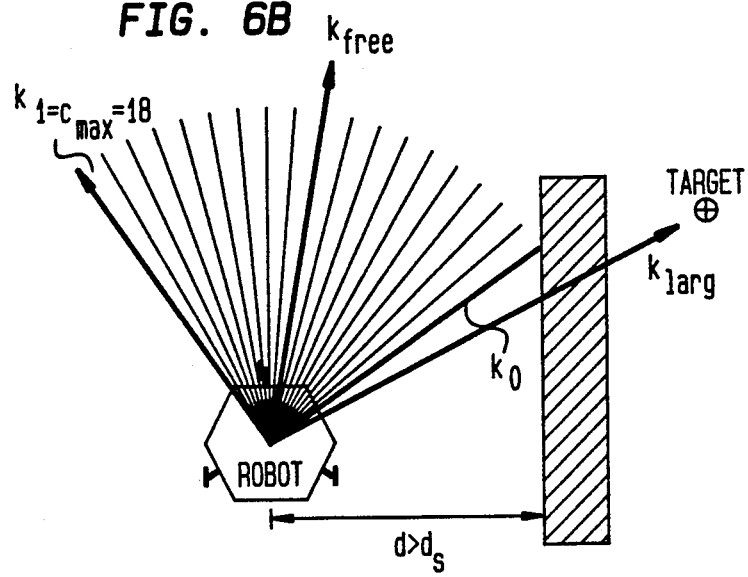
Figure 6C:
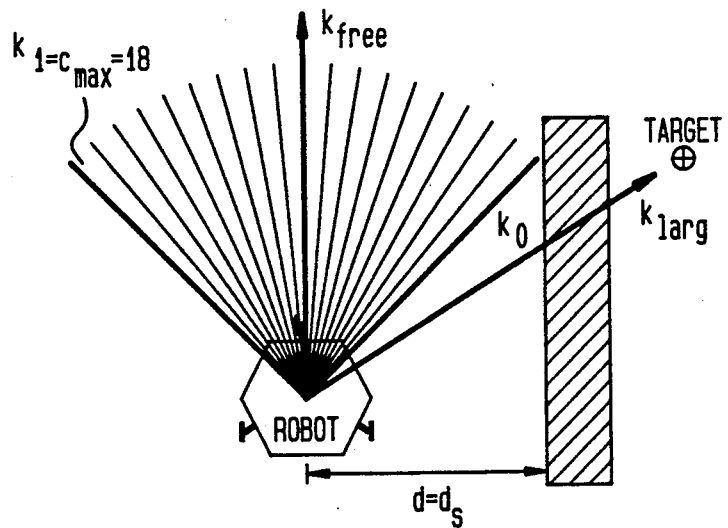

The above-described method of computing the steering command $\theta_{free}$ has the following characteristics:

a. If, as indicated in FIG. 5B, the only obstacle is obstacle A (i.e., obstacle B is not present), the algorithm will count, in this specific embodiment, up to a maximum of 18 free segments. Therefore, $\Phi$ will be $c_{max}$=18 segments (or, in degrees, r $c_{max}$=90°) wide, and the resulting bisector of $\Phi$, $k_{free}$, will point away from the obstacle, as shown in FIG. 6A, if the robotic vehicle was too close to the obstacle. If the robotic vehicle was further away from the obstacle, as shown in FIG. 6B, $k_{free}$ will point toward the obstacle, and the robotic vehicle will approach the obstacle closer. The net effect of these two opposite conditions is that the robotic vehicle assumes a stable distance $d_s$ from the obstacle, as shown in FIG. 6C. The value $d_s$ is mostly a function of $c_{max}$, but is also influenced by sensor characteristics, sampling frequency, etc. In one practical embodiment of the invention, $d_s$ is approximately between 80 cm to 100 cm. This relatively large distance is very desirable because it holds a good safety margin and allows the robotic vehicle to travel at high speeds alongside an obstacle.

b. If obstacle B is present, as illustrated in FIG. 5B, then $\theta_{free}$ will point in a direction along the centerline between the two obstacles. The robotic vehicle will therefore always travel in the middle between two obstacles. This holds true for obstacles which are very close to one another, as well as those which are further apart. In the former case, $\Phi$ will be very narrow (i.e., $k_1-k_0$ will be small). The width of $\Phi$ can be used as a measure to reduce the speed of the robotic vehicle, since a narrow value for $\Phi$ is indicative of a dangerously narrow passage.

As indicated, the speed of the robotic vehicle can be controlled in response to obstacle density. At the beginning of each run, the operator of the robotic vehicle can choose a maximum speed, $S_{max}$. During the run, the vector field histogram algorithm determines the speed reference command S in each sampling interval, first by setting S equal to $S_{max}$, so as to maintain maximum speed to the extent possible. The speed then is reduced in response to two functions:

a. The algorithm checks the polar obstacle density $H'(k)$ in the current direction of travel, $\theta_c$. A non-zero value indicates that an obstacle is ahead of the robotic vehicle and that a reduction of speed is indicated. A large value of $H'(k_c)$ means that either a physically large obstacle is ahead of the robotic vehicle, or that the robotic vehicle is heading toward a nearby obstacle. Either case is likely to require a drastic change of direction. A reduction of speed is important, in order to allow for the steering wheels to turn in the new direction. Mathematically, this proportional speed reduction is implemented in the following function:

$$H''(k_c) = MIN(H'(k_c), H_c) \qquad Eq.\ 8$$

$$S' = S_{max}(1 - H''(k)/H_c) \qquad Eq.\ 9$$

where $H_c$ is an empirically determined constant which causes a sufficient speed reduction.

b. Although the steering function set forth in a. above basically acts upon an anticipated need, speed is further reduced proportionally to the actual steering rate, $\Omega$, where $\Omega = d\theta/dt$. This function is implemented as:

$$S'' = S'(1 - \Omega/\Omega_{max}) \qquad Eq.\ 10$$

where $\Omega_{max}$ is the maximal allowable steering rate for the robotic vehicle.

The system described hereinabove has been implemented and experimentally tested on a commercially available mobile platform known as Cybermation K2A. This platform has a maximum travel speed of $S_{max}=0.78$ m/sec, a maximum steering rate of $\Omega=120°$/sec, and weighs approximately 125 kg. The Cybermation platform has a three-wheel drive which permits omnidirectional steering. A Z-80 on-board computer controls the vehicle.

The experimental vehicle was equipped with a ring of 24 ultrasonic sensors manufactured by Polaroid. The resulting sensor ring has a diameter of approximately 0.8 m, and objects must be at least 0.27 m away from the sensors in order to be detected. Thus, the theoretical minimum width for safe traveling in a passageway is $W_{min}=0.8$ m+2(0.27) m=1.34 m. Two computers have been added to the Cybermation platform. One is a PC-compatible single board computer which is used to control the sensors, and a 20 MHz, 80386-based AT-compatible which runs the vector field histogram algorithm.

The robotic vehicle was operated under vector field histogram control through several difficult obstacle courses. Obstacles which were used were unmarked, every-day objects, such as chairs, partitions, bookshelves, etc. In most of the experiments, the vehicle operated at its maximum speed of 0.78 m/sec. This speed is reduced only when an obstacle is approached frontally or if required for dynamic reasons, as explained hereinabove.

Figure 7:
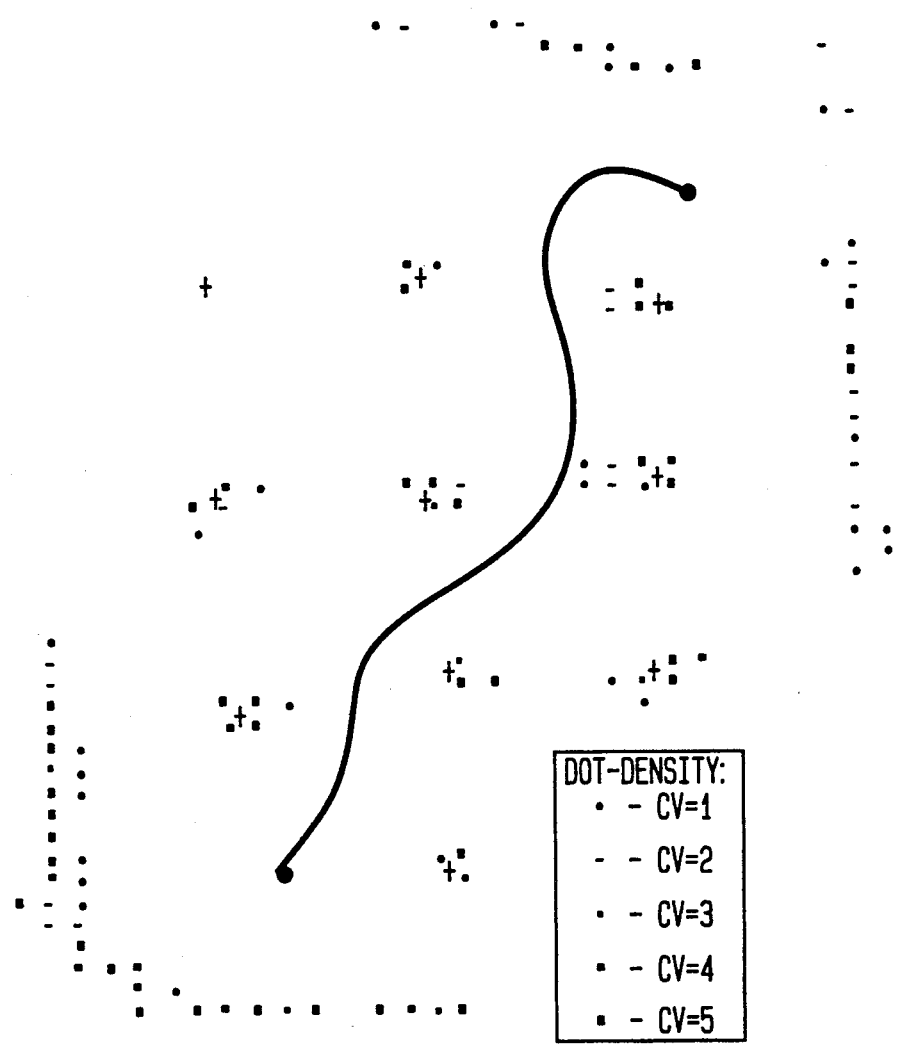
FIG. 7 is a representation of a histogram grid of an actual experimental run by a robotic vehicle through a field of densely spaced obstacles in the form of thin vertical poles.

FIG. 7 is a representation of the histogram grid after the robotic vehicle has traveled through a particularly challenging obstacle course. In this experiment, thin vertical poles were spaced at a distance of approximately 1.5 m from each other. The poles comprised a variety of $\frac{1}{2}"$ and $\frac{3}{4}"$ round and $1"$ by $1"$ square rods. The approximate original location of the rods is indicated with (+) symbols in this figure. Each dot in FIG. 7 represents one cell in the histogram grid. In the present experimental implementation, certainty values range from 0 to 5, where CV=0 means that no sensor reading has been projected into the cell during the run (no dot at all). CV=1 (to 4) means that 1 (to 4) readings have been projected into the cell. A table correlating dot density with certainty value is shown in this figure where a dot comprises one or more pixels in a monitor screen representation. CV=5 means that 5 or more readings have been projected into the same cell, and this is represented by a nine pixel dot in FIG. 7. The robotic vehicle traversed the obstacle course with an average speed of 0.58 m/sec, without stopping in front of the obstacles.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of operating a vehicle to avoid an obstacle in a field of operation, the method comprising the steps of:

installing in a first memory first data defining a first array of first grid cells, each for holding data corresponding to a respective value, said first grid cells in said first array corresponding to respective predetermined subfields in the field of operation;

scanning one of said subfields in the field of operation for determining the presence of an obstacle therein;

incrementing said value in a first grid cell in said first array corresponding to said scanned one of said subfields in response to a signal responsive to said step of scanning indicating a likelihood that an obstacle is present in said scanned one of said subfields;

defining a region of operation in the vicinity of the vehicle; and computing a plurality of vectorial values, each vectorial value being responsive to the location of each first grid cell in said first array within said defined region of operation, with respect to the location of the vehicle, and said values in said first grid cells.

2. The method of claim 1 wherein said step of defining comprises the further step of installing in a second memory second data defining a second array of second grid cells, each for holding data corresponding to a respective value, said second grid cells in said second array having a fixed positional relation with respect to the vehicle.

3. The method of claim 2 wherein said step of computing comprises the further steps of:

precomputing a plurality of vectorial value components, each responsive to the location of an associated one of said second grid cells with respect to the vehicle; and storing said vectorial value components in said second memory.

4. The method of claim 3 wherein said step of computing comprises the further steps of:

overlaying said second array over said first array whereby at least partial registration is effected between second grid cells and first grid cells;

multiplying a vectorial value component in one of said second grid cells by a value in a one of the first grid cells with which it is in registration, for forming a respective virtual repulsive vector value; and summing vectorially a plurality of said respective virtual repulsive vector values for forming a composite repulsive virtual vector value.

5. The method of claim 4 wherein there are provided the further steps of:

storing in a third memory data corresponding to a targetdirected vector; and summing vectorially said target-directed vector and said composite repulsive virtual vector value, for producing a vehicle-steering vector value.

6. The method of claim 5 wherein there is provided the further step of applying low-pass filtering to said vehiclesteering vector value for reducing a rate of variation thereof.

7. The method of claim 5 wherein said composite repulsive virtual vector value is inversely related to $d^x$, where d is the distance between a second grid cell and the vehicle, and x is a positive real number.

8. The method of claim 1 wherein said first array of said first grid cells defined by said first data is a rectangular array, and there is provided the further step of constructing a polar histogram corresponding to the vicinity of the location of the vehicle.

9. The method of claim 8 wherein said polar histogram corresponds to n angular segments, each having a width r.

10. The method of claim 9 wherein each of said segments of said polar histogram has associated therewith a polar obstacle density value corresponding to a particular direction with respect to the location of the vehicle.

11. The method of claim 10 wherein there are provided the further steps of:

selecting a direction corresponding to one of said n angular segments, in response to said polar obstacle density value; and directing the vehicle in said selected direction.

12. The method of claim 8 wherein said step of constructing a polar histogram comprises the further steps of:

defining an active region in the vicinity of the vehicle; and computing a plurality of obstacle vector values, each obstacle vector value having a directional component responsive to the location of each first grid cell in said first array within said defined active region, with respect to the location of the vehicle.

13. The method of claim 12 wherein said step of computing comprises the further step of computing a magnitude component of said obstacle vector values, said magnitude component being responsive to respective distances between the vehicle and said first grid cells and said values in said first grid cells.

14. The method of claim 13 wherein there is provided the further step of searching said obstacle vector values for a direction within a predetermined range of directions.

15. The method of claim 14 wherein there is provided the further step of selecting a direction for steering the vehicle corresponding to a one of said directions which has a value corresponding to less than a predetermined maximum obstacle vector value.

16. The method of claim 15 wherein said selected direction corresponds to a direction substantially toward a predetermined target location, and step of selecting comprises the further step of steering the vehicle toward said selected direction.

17. The method of claim 12 wherein there is provided the further step of controlling a speed of the vehicle in response to an obstacle vector value.

18. A method of operating a vehicle to avoid an obstacle in a field of operation, the method comprising the steps of:

installing in a first memory first data for defining an array of first grid cells, each for holding data corresponding to a respective value, said first grid cells in said first array corresponding to respective predetermined subfields in the field of operation;

installing in a second memory data corresponding to a desired direction of travel of the vehicle;

scanning said subfields sequentially for determining the presence of an obstacle therein;

incrementing said values in said first grid cells in response to said step scanning of said subfields, said values being responsive to the likelihood of an obstacle being present in said subfields;

defining an active region of operation in the vicinity of the vehicle;

computing a plurality of vectorial values, each vectorial value having a direction component responsive to the location of each first grid cell in said array within said defined region of operation, with respect to the location of the vehicle in said active region of operation, and a magnitude component responsive to said likelihood of an obstacle being encountered in said direction within said region of operation; and steering the vehicle in a direction responsive to said data in said second memory and said vectorial values.

19. The method of claim 18 wherein said step of installing in a second memory comprises the step of manipulating a direction-indicating device.

20. The method of claim 18 wherein prior to performing said step of steering the vehicle there are provided the further steps of:

summing vectorially said vectorial values obtained in said step of computing, for forming a composite repulsive virtual vector value; and combining vectorially said composite repulsive virtual vector value with said data in said second memory for producing a resultant directional vector.

21. A method of guiding a vehicle on a field of operation having obstacles to be avoided thereon, the method comprising the steps of:

dividing the field of operation into a plurality of subfields;

assigning a predetermined certainty value associated with each of said subfields;

scanning selected ones of said subfields for establishing the possible presence of an obstacle thereon;

incrementing said certainty value associated each of said subfields for which it is established in said step of scanning that an obstacle possibly is present thereon; and computing a vector value responsive to the location of at least one of said subfields with respect to the location of the vehicle, and said certainty value associated therewith.

22. The method of claim 21 wherein there are provided the further steps of:

further computing a plurality of vector values having direction components corresponding to a range of potential directions of travel of the vehicle; and selecting a direction of travel for the vehicle in response to a magnitude component of at least one of said vector values.

23. The method of claim 21 wherein there is provided the further step of storing in a location memory location data corresponding to the location of the vehicle.

24. The method of claim 21 wherein there is provided the further step of storing in a direction memory direction data corresponding to a desired direction of travel for the vehicle.

25. The method of claim 24 wherein said step of storing in a direction memory comprises the further step of manipulating a direction-indicating device.

26. The method of claim 25 wherein said direction-indicating device is a two-dimensional controller.

27. The method of claim 21 wherein there is provided the further step of storing in a target memory location data corresponding to a location in the field of operation of a target location to which the vehicle is to travel.

28. A vehicle for traveling in a region of operation having obstacles to be avoided, the vehicle comprising:

first memory means for containing first data defining a first array of first grid cells, each for holding data corresponding to a respective value, said first grid cells in said first array corresponding to respective predetermined subfields in the region of operation;

scanning means for scanning one of said subfields in the field of operation for determining the presence of an obstacle therein;

processor means for incrementing a value in said first memory means associated with said scanned one of said subfields in response to a signal responsive to said scanning means indicating a likelihood that an obstacle is present in said scanned one of said subfields; and input means coupled to said processor means, said input means being responsive to an operator of the vehicle for producing data responsive to a desired direction of travel selected by the operator, subject to the presence of an obstacle in said desired direction of travel.

29. The vehicle of claim 28 wherein said input means comprises a direction-indicating apparatus for manipulation by said operator.

30. The vehicle of claim 29 wherein said operator is remote from the vehicle, and said input means is arranged off of the vehicle.

31. The vehicle of claim 28 wherein said data produced by said input means corresponds to a vector having a direction component indicative of a desired direction of travel.

32. The vehicle of claim 28 wherein said data produced by said input means corresponds to a location on the region of operation to which the vehicle is desired to travel.

* * * * *

UNITED STATES PATENT AND TRADEMARK OFFICE
CERTIFICATE OF CORRECTION

PATENT NO. : 5,006,988

DATED : April 9, 1991

INVENTOR(S) : Borenstein, et al.

It is certified that error appears in the above-identified patent and that said Letters Patent is hereby corrected as shown below:

Column 1, between the title and the heading "Background of the Invention", please insert the following paragraph:

-- Government Rights

This invention was made with Government support under Contract No. DE-FG02-86NE37969 awarded by the Department of Energy. The Government has certain rights in the invention.--;

Col. 3, line 41, change "forgoing" to -- foregoing --;

Col. 4, line 21, change "forgoing" to -- foregoing --;

Col. 4, line 23, change "targetdirected" to -- target-directed --;

Col. 4, line 32, change "lowpass" to -- low-pass --;

Col. 4, line 36, change "forgoing" to -- foregoing --;

Col. 6, line 13, change "and" to -- an --;

Col. 11, line 51, change "$\theta$free'" to -- $\theta_{free}$, --;

Col. 11, line 53, change "$\theta$free" to -- $\theta_{free}$ --;

Col. 11, line 54, change "$\theta$free" to -- $\theta_{free}$ --;

Col. 11, line 55, change "$\theta$targ" to -- $\theta_{targ}$ --;

Col. 11, line 55/56, change "($^k$targ)" to -- ($k_{targ}$) --;

Col. 12, line 6, change "$\theta$free" to -- $\theta_{free}$ --;

UNITED STATES PATENT AND TRADEMARK OFFICE
CERTIFICATE OF CORRECTION

PATENT NO. : 5,006,988

DATED : April 9, 1991

INVENTOR(S) : Borenstein, et al.

It is certified that error appears in the above-identified patent and that said Letters Patent is hereby corrected as shown below:

Col. 12, line 14, change "new" to -- $\underline{new}$ --;

Col. 12, line 44, change "$H(k_{1+1}) > H^{max}$ to -- $H(k_{1+1}) > H^{max}$ --;

Col 15, line 40, change "targetdirected" to -- target-directed --; and

Col. 15, line 46, change "vehiclesteering" to -- vehicle-steering --.

Signed and Sealed this

Twenty-seventh Day of October, 1992

*Attest:*

DOUGLAS B. COMER

*Attesting Officer*   *Acting Commissioner of Patents and Trademarks*